United States Patent [19]
Neill et al.

[11] Patent Number: 5,535,102
[45] Date of Patent: Jul. 9, 1996

[54] POWER DISTRIBUTION SWITCHBOARD ASSEMBLY

[75] Inventors: Kenneth Neill; Keith W. Ball, both of Swibon, United Kingdom

[73] Assignee: Square D Company, Palatine, Ill.

[21] Appl. No.: 394,088

[22] Filed: Feb. 24, 1995

Related U.S. Application Data

[63] Continuation-in-part of Ser. No. 211,025, Jul. 19, 1994, abandoned.

[51] Int. Cl.⁶ .................................................. H02B 1/04
[52] U.S. Cl. ............................ 361/832; 361/645; 439/527
[58] Field of Search ................................ 248/27.1, 214, 248/221.2, 220.2, 220.4, 241, 220.3; 312/223.1; 439/527, 530; 200/296; 361/601, 622, 605, 624, 627, 631, 633–637, 640, 641, 644, 645, 647, 648, 724, 725, 807, 809, 810, 832

[56] References Cited

U.S. PATENT DOCUMENTS

| | | | |
|---|---|---|---|
| 3,786,313 | 1/1974 | Coles | 317/120 |
| 4,079,439 | 3/1978 | Coles | 361/355 |
| 4,366,528 | 12/1982 | Cole | 361/429 |
| 4,667,268 | 5/1987 | Mrowka | 361/353 |
| 4,720,769 | 1/1988 | Raabe | 361/644 |
| 5,295,042 | 3/1994 | Midgkey | 361/634 |

FOREIGN PATENT DOCUMENTS

| | | | |
|---|---|---|---|
| 1124818 | 12/1965 | United Kingdom . | |
| 1014025 | 12/1965 | United Kingdom | 361/832 |
| 1237597 | 2/1969 | United Kingdom | 248/221.2 |

*Primary Examiner*—Gerald P. Tolin
*Attorney, Agent, or Firm*—Larry I. Golden; Kareem M. Irfan; Wayne H. Stoppelmoor

[57] ABSTRACT

A power distribution switchboard assembly is provided which is adapted to accept plug-in outgoer mechanical base fixing/location arrangements or units having different physical size and format. The switchboard assembly includes at least two rear mounting plates each formed with interspersed different format apertures in a longitudinal direction. The two rear mounting plates are located in juxtaposed relationship and are adjustable in a lateral direction so as to be spaced apart by different specified distances and together be capable of accepting different sized plug-in outgoer arrangements.

2 Claims, 3 Drawing Sheets

POWER DISTRIBUTION SWITCHBOARD ASSEMBLY

This application is a Continuation-in-Part of patent application Ser. No. 08/211,025, filed Jul. 19, 1994 abandoned.

The invention relates to power switchboards and more particularly to power distribution switchboard assemblies having the capability to accept or locate a multiplicity of different physical sized plug-in outgoer units.

A power distribution switchboard assembly is provided which is adapted to accept plug-in outgoer mechanical base fixing/location arrangements or units having different physical size and format. The switchboard assembly includes at least two rear mounting plates each formed with interspersed different format apertures in a longitudinal direction. The two rear mounting plates are located in juxtaposed relationship and are adjustable in a lateral direction so as together to be capable of accepting different sized plug-in outgoer arrangements.

The switchboard assembly is capable of accepting at least encased (enclosed) or unencased (unenclosed) molded case circuit breakers and plug-in encased (enclosed) fuse switches as plug-in outgoers. Front trim panels may be provided of a size and style to accommodate the different sized plug-in outgoers fitted to the switchboard assembly.

The foregoing and further features of the invention may be more readily understood from the following description of a preferred embodiment, by way of example, with reference to the accompanying drawings, in which.

Figure 1:
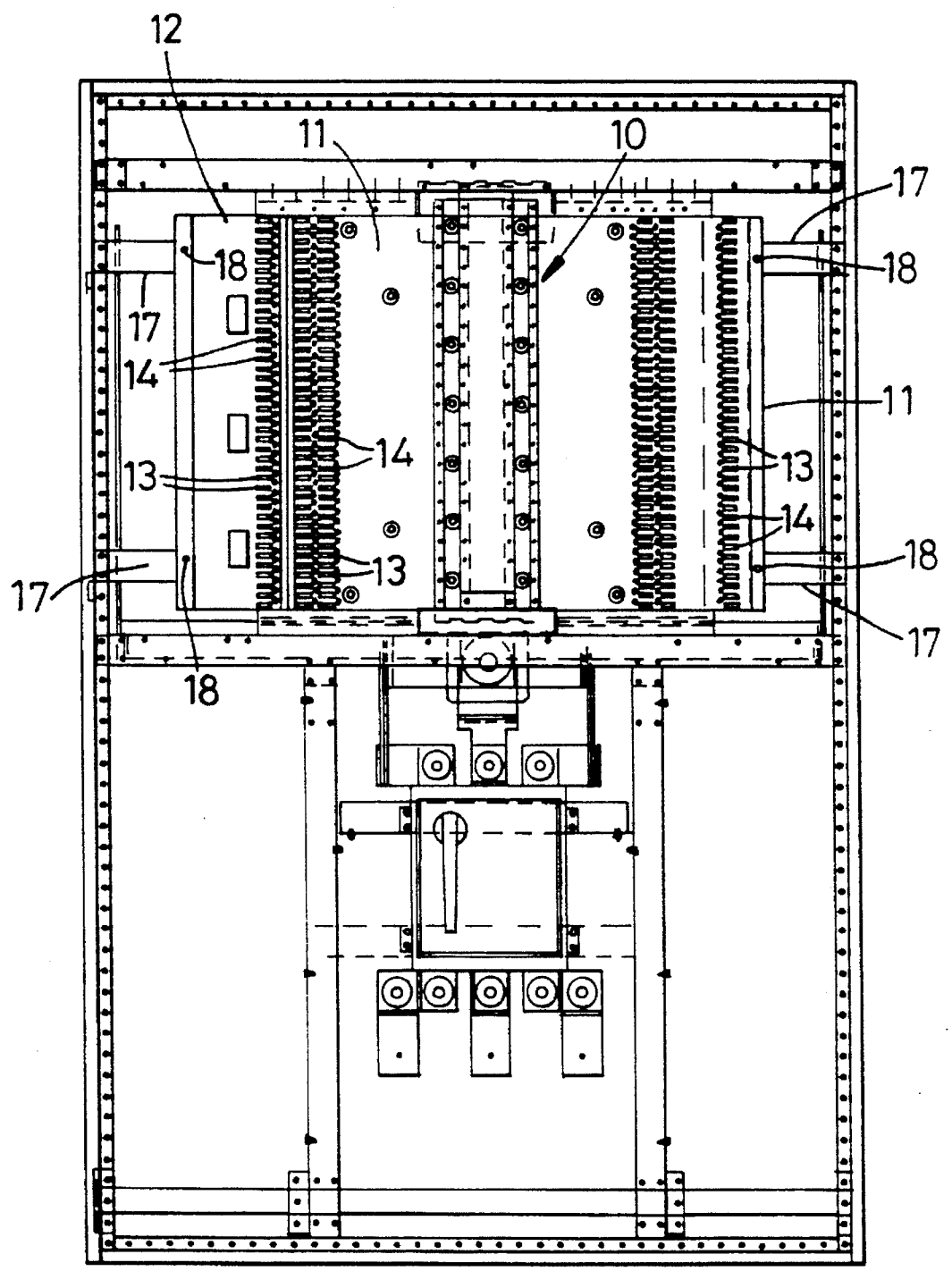
FIG. 1 is a front elevational view of a power distribution switchboard assembly according to this invention.

Referring now to the drawings there is shown a power distribution switchboard assembly which comprises a bus stack 10 for accepting the electrical connections of plug-in outgoer units such as encased or unencased molded case circuit breakers and plug-in encased (enclosed) fuse switches. Such plug-in devices are well known and the method of their electrical connection is conventional. After electrical connection is completed, the mechanical location for such outgoer units is provided by rear mounting plates 11 and 12.

Each of the rear mounting plates 11 and 12 is formed with location apertures 13 and 14 interspersed one between the other in a longitudinal direction down the mounting plates. The apertures 13 are merely lateral slots whereas the apertures 14 are generally "Y" shaped in a lateral direction. The provision of interspersing of the apertures 13 and 14 along the length of the mounting plates enables the mechanical location of the different outgoer units as required.

Figure 2:
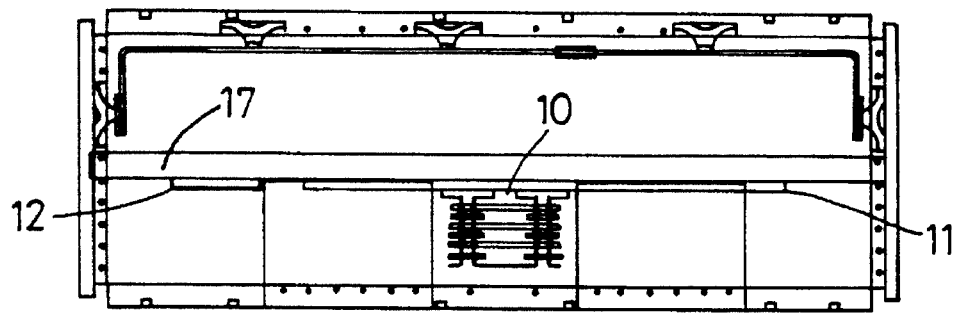
FIG. 2 is a plan view of the switch board assembly of FIG. 1.
Figure 3:
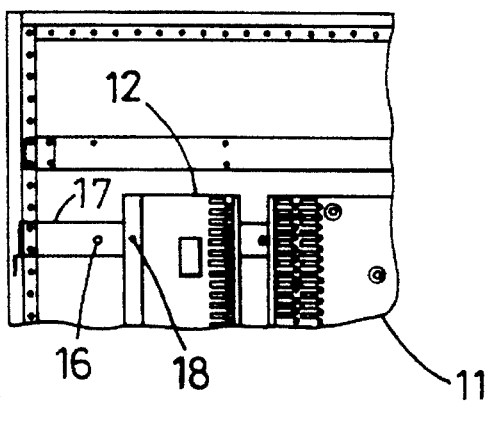
FIG. 3 is a fragmentary front elevational view of the switchboard assembly of FIG. 1 with a rear mounting plate located in a different position to that shown in FIG. 1.
Figure 4:
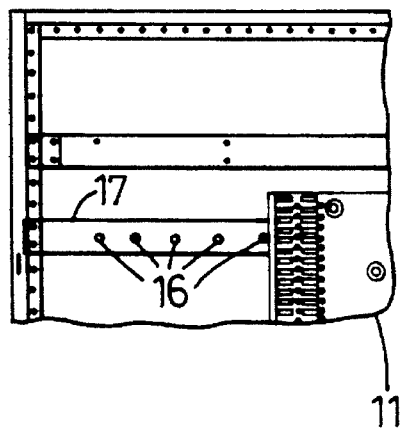
FIG. 4 is a fragmentary front elevational view similar to that of FIG. 3 without a second rear mounting plate.

In particular, the rear mounting plate 12 is adjustable from a position which is immediately adjacent the edge of the rear mounting plate 11 to a range of positions where plate 12 is spaced apart at specified distances therefrom (See FIGS. 2 and 3). The specific positioning of location or rear mounting plate 12 can be adjusted by positioning the plate at the necessary space—apart position and attaching the plate to appropriate ones of fixing apertures 16 defined on a framework support member 17 by using screws 18. The arrangement of the rear mounting plates 11 and 12 as shown in FIG. 1 is suitable for accepting unenclosed circuit breakers, whereas the arrangement shown in FIG. 3 is suitable for receiving enclosed circuit breakers or enclosed fuse switches.

Figure 5:
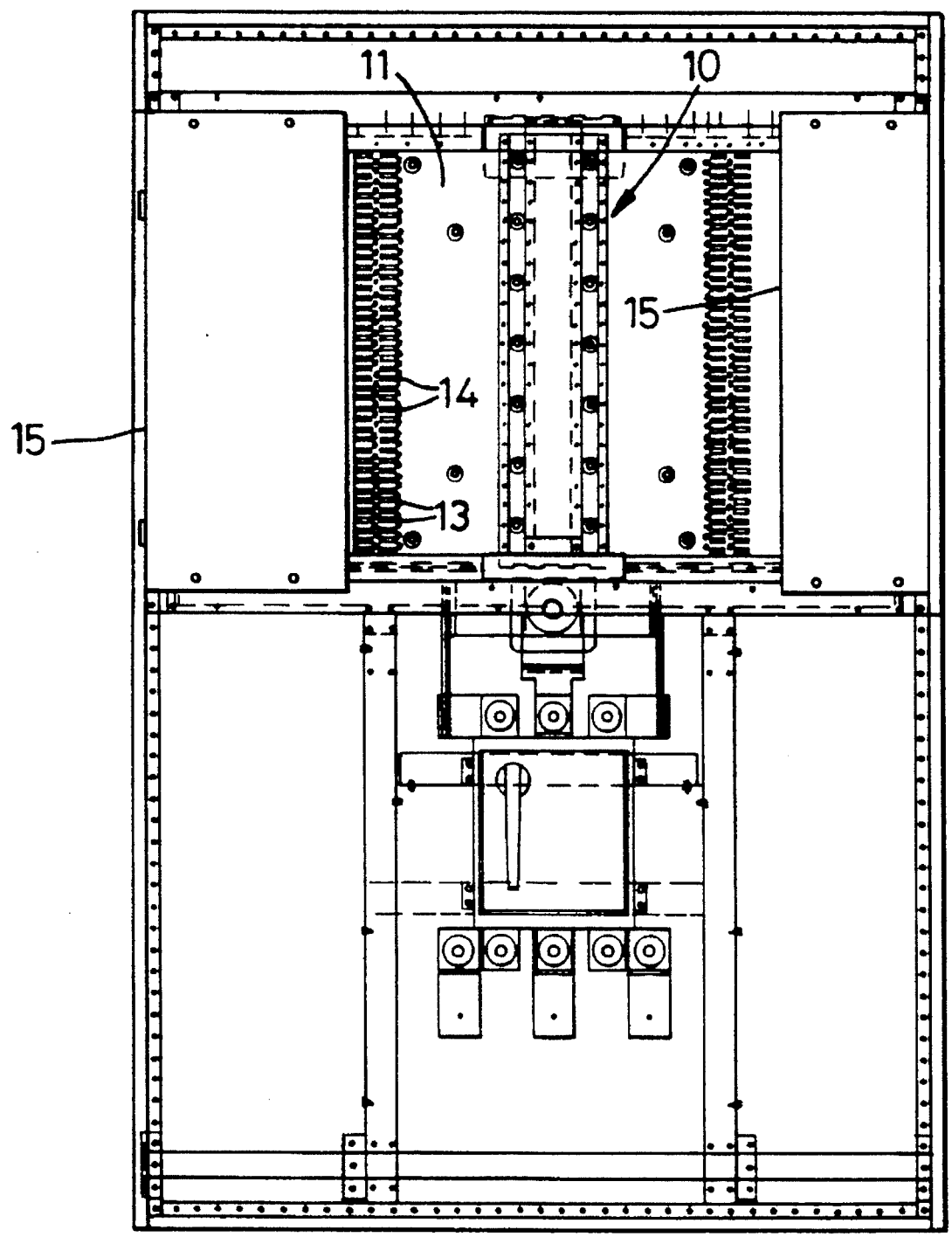
FIG. 5 is a front elevational view of the switchboard of FIG. 1 with front trim panels located thereon.

Various styles and sizes of front trim panels 15 can be provided to accommodate the different sized plug-in outgoers fitted to the switchboard assembly. Two such full length trim panels 15 are shown in FIG. 5.

Using the foregoing novel adjustable mounting plate arrangement, a variety of outgoer unit combinations can be easily accommodated in a power distribution arrangement by utilizing a single switchboard assembly. For instance, some typical outgoer combinations include:

a) one side of the switchboard assembly with unenclosed plug-in molded case circuit breakers and the other side with plug-in enclosed fuse switches;

b) a mixture of plug-in enclosed molded case circuit breakers and enclosed plug-in fuse switches at either side of the switchboard assembly; and c) one side of the switchboard assembly accommodating plug-in unenclosed molded case circuit breakers and the other side having plug-in enclosed molded case circuit breakers.

What is claimed is:

1. A power distribution switchboard assembly capable of accepting plug-in outgoer base mechanical fixing/location arrangements or units having different sizes and format, said assembly comprising:

a framework support member disposed in said switchboard assembly; and a first plate and a second plate secured to said framework support member, each formed with interspersed different format location apertures defined along a longitudinal direction, said first and second plates being located in juxtaposed relationship and being adjustable in a lateral direction so as to be capable of accepting different sized plug-in outgoer mechanical base fixing arrangements, wherein said second plate is adjustable from a position immediately adjacent to the edge of said first plate to different positions spaced at specified distances apart therefore by attaching said second plate to appropriate ones of a plurality of fixing apertures in said framework support member, said distances being sufficient to accommodate the mechanical location of the different outgoer units.

2. A switchboard assembly as claimed in claim 1, further including front trim panels, disposed on said switchboard assembly, which are sized to correspond to the different sized plug-in outgoer units.

* * * * *